US006885372B1

(12) United States Patent  
Baxter, III et al.

(10) Patent No.: US 6,885,372 B1
(45) Date of Patent: *Apr. 26, 2005

(54) RASTERIZATION OF LINES IN A POLAR PIXEL GRID

(75) Inventors: William V. Baxter, III, Durham, NC (US); Michael Giovinco, Cambridge, MA (US)

(73) Assignee: Actuality Systems, Inc., Burlington, MA (US)

( * ) Notice: Subject to any disclaimer, the term of this patent is extended or adjusted under 35 U.S.C. 154(b) by 672 days.

This patent is subject to a terminal disclaimer.

(21) Appl. No.: 09/642,897

(22) Filed: Aug. 21, 2000

(51) Int. Cl.$^7$ .............................. G09G 5/24; G09G 5/26; G09G 5/30; G09G 5/36

(52) U.S. Cl. ...................... 345/442; 345/440; 345/441; 345/443; 345/418

(58) Field of Search ............................... 345/440, 441, 345/443, 418

(56) References Cited

U.S. PATENT DOCUMENTS

| | | | |
|---|---|---|---|
| 4,484,298 A | 11/1984 | Inoue et al. | 364/720 |
| 4,983,031 A | 1/1991 | Solomon | |
| 4,987,554 A | 1/1991 | Kaufman | 364/522 |
| 5,754,147 A | 5/1998 | Tsao et al. | 345/6 |
| 5,954,414 A | 9/1999 | Tsao | 353/7 |
| 6,489,961 B1 * | 12/2002 | Baxter et al. | 345/424 |

OTHER PUBLICATIONS

"New Display Gives Realistic 3-D Effect" Aviation Week, pp. 66–67, Oct. 1960.
"Computer Graphics: Principles and Practice–2nd Edition in C", by James D. Foley et al., pp. 72–91, Jul. 1995.
A. Amorosso and G. Casciola, "A new approach to perspective view of spherical coordinate functions", Department of Mathematics, University of Bologna, No. 16, 1998, pp. 1–23.
"Optimized Drawing of Filled and Unfilled Circles in a Two–Dimensional Graphics System", IBM Technical Disclosure Bulletin, vol. 33, No. 68, Nov. 1, 1990, pp. 291–295.

* cited by examiner

*Primary Examiner*—Jeffery Brier
*Assistant Examiner*—Javid Amini
(74) *Attorney, Agent, or Firm*—Fish & Richardson, PC

(57) ABSTRACT

A method of rasterizing a line on a display having pixels with locations defined by a polar coordinate system uses the sign of a discriminant to choose which of two candidate pixels is to be the next pixel on the rasterized line. The discriminant, which is derived from the desired line, is evaluated at a point in the neighborhood of the candidate pixels. The discriminant value depends on the local slope of the line in polar coordinates. The method divides the line into segments having selected ranges of slope and rasterizes the desired line along each segment.

28 Claims, 11 Drawing Sheets

```
stepsPerRad = θ_numsteps/2π;        // angle conversion constant

//////////////////////////////// CARTESIAN INITIALIZATION ////
Input: integer, fixed point or floating point (x1, y1) and (x2, y2)

if ((x1*y2-x2*y1) < 0) {         // make endpoints go CCW around origin
22 ⎨   SWAP(x1,x2); SWAP(y1,y2);
     }
     dx = x2 - x1;
     dy = y2 - y1;
24 ⎨ r1f = sqrt(x1*x1 + y1*y1);       // start point radius
     r2f = sqrt(x2*x2 + y2*y2);       // end point radius
     θ1f = atan2(y1, x1) * stepsPerRad;   // start point angle
     θ2f = atan2(y2, x2) * stepsPerRad;   // end point angle
26 ⎨ if (θ1f > θ2f)                   //correct for discontinuity in angle
         θ2f += θ_numsteps;
     A = dy;                          // line 'A' constant
30 ⎨ B = -dx;                         // line 'B' constant
     C = -(A*x1+B*y1);                // line 'C' constant
     θ1 = ROUND(θ1f);                 // integer start angle
     θ2 = ROUND(θ2f);                 // integer end angle
28 ⎨ r1 = ROUND(r1f);                 // integer start radius
     r2 = ROUND(r2f);                 // integer end radius
     θ = θ1;                          // initialize current position
34 ⎨ r = r1;
32 ⎨ if (dx*x1 + dy*y1 < 0 && dx*x2 + dy*y2 > 0)   // Compute minimal radius
         r_min = ABS(ROUND(C / sqrt(dx*dx+dy*dy)));
     else
         r_min = MIN(r1, r2);

36 — SetPixel(r,θ,c);                 // draw first pixel
```

FIG. 7

```
stepsPerRad = θ_numsteps/2π;              // angle conversion constant        46
///////////////////////////// POLAR INITIALIZATION ////
Input: integer (r1, θ1) and (r2, θ2)
48  if (θ1 < θ2)                     // Make sure to go CCW
      SWAP(θ1, θ2);
50  if ( (θ2 - θ1) > θ_numsteps*0.5)
      θ2 += θ_numsteps;

52  { y1 = r1*IntegerSin(2*θ1);
      y2 = r2*IntegerSin(2*θ2);        } 56
      x1 = r1*IntegerCos(2*θ1);
      x2 = r2*IntegerCos(2*θ2);

dx = x2 - x1;
    dy = y2 - y1;
    A = dy;
    B = -dx;                                          //calculate line constants
    C = -(A*x1+B*y1);
58  θ = θ1;                                           //initialize current position
    r = r1;
54  if (dx*x1 + dy*y1 < 0 && dx*x2 + dy*y2 > 0)       //compute minimal radius
      r_min = ABS(ROUND(C / sqrt(dx*dx+dy*dy)));
    else
      r_min = MIN(r1,r2);
60  SetPixel(r,θ,c);                      // draw first pixel
```

FIG. 8

```
///////////////////// REGION 1 /////////////////////
sθ = IntegerSin(2*θ+1);
cθ = IntegerCos(2*θ+1);
r_coef = A*cθ + B*sθ;
dθ = stepsPerRad*r_coef;
dθ_sgn = SGN(dθ);
dθ *= -dθ_sgn;
dr_coef = (A*sθ - B*cθ)*dθ_sgn;
dr = (r-1)*dr_coef;
d = (r-1) * r_coef + C;
while (dr < dθ
        && θ <= θ_2
        && r > r_min)
{
    if (d<0 && θ!=θ_2) {
        θ += 1;
        r -= 1;
        sθ = IntegerSin(2*θ+1);
        cθ = IntegerCos(2*θ+1);
        r_coef = A*cθ + B*sθ;
        dθ = stepsPerRad*r_coef;
        dθ_sgn = SGN(dθ);
        dθ *= -dθ_sgn;
        dr_coef = (A*sθ - B*cθ)*dθ_sgn;
        dr = (r-1)*dr_coef;
        d = (r-1) * r_coef + C;
    }
    else {
        r -= 1;
        dr -= dr_coef;
        d -= r_coef;
    }
    SetPixel(r,θ,c);
}
```

// check for region change

// step in θ and r

// update region and decision vars

// step in r only

// update region and decision vars

// draw current pixel

FIG. 9

```
//////////////////////////////// REGION 2 ////
sθ = IntegerSin(2*(θ+1));
cθ = IntegerCos(2*(θ+1));
r_coef = A*cθ + B*sθ;
dθ_sgn = SGN(r_coef);
dr_coef = (A*sθ - B*cθ)*dθ_sgn;
dr = (r-0.5)*dr_coef;
while (dr < 0
       && θ < θ_2
       && r >= r_min)
{
    d = (r-0.5) * r_coef + C;      // check for region change
    if (d>0 && r!=r_min) {
        r -= 1;                     // step in θ and r
        θ += 1;
    }
    else {
        θ += 1;                     // step in θ only
    }
    sθ = IntegerSin(2*(θ+1));
    cθ = IntegerCos(2*(θ+1));
    r_coef = A*cθ + B*sθ;
    dθ_sgn = SGN(r_coef);
    dr_coef = (A*sθ - B*cθ)*dθ_sgn;  // update region and decision vars
    dr = (r-0.5)*dr_coef;
    SetPixel(r, θ, c);               // draw current pixel
}
```

FIG. 10

```
//////////////////////////////// REGION 3 ////
dθ = stepsPerRad*r_coef*dθ_sgn;
dr_coef = (A*sθ - B*cθ)*dθ_sgn;
dr = (r+0.5)*dr_coef;
while (dr < dθ                              // check for region change
       && θ < θ_2
       && r <= r2)
{
    d = (r+0.5) * r_coef + C;
    if (d<=0 && r!=r2) {                    // step in θ and r
        r += 1;
        θ += 1;
    }
    else {                                  // step in θ only
        θ += 1;
    }
    sθ = IntegerSin(2*(θ+1));               // update region and decision vars
    cθ = IntegerCos(2*(θ+1));
    r_coef = A*cθ + B*sθ;
    dθ = stepsPerRad*r_coef;
    dθ_sgn = SGN(dθ);
    dθ *= dθ_sgn;
    dr_coef = (A*sθ - B*cθ)*dθ_sgn;
    dr = (r+0.5)*dr_coef;
    SetPixel(r,θ,c);                        // draw current pixel
}
```

FIG. 11

```
//////////////////// REGION 4 ////
sθ = IntegerSin(2*θ+1);
cθ = IntegerCos(2*θ+1);
r_coef = A*cθ + B*sθ;
d = (r+1) * r_coef + C;
while (θ <= θ_2
        && r < r_2)
{
    if (d>0 && θ!=θ_2) {         // step in θ and r
        r += 1;
        θ += 1;
        sθ = IntegerSin(2*θ+1);
        cθ = IntegerCos(2*θ+1);
        r_coef = A*cθ + B*sθ;
        d = (r+1) * r_coef + C;   // update decision variable
    }
    else {                        // step in r only
        r += 1;
        d += r_coef;              // update decision variable
    }
    SetPixel(r,θ,c);
}
```

FIG. 12

RASTERIZATION OF LINES IN A POLAR PIXEL GRID

This invention relates to computer graphics, and in particular, to the rendering of a straight line on a display in which the pixels are arranged on a polar coordinate grid.

BACKGROUND

Many computer-implemented displays consist of two-dimensional arrays of individual picture elements, or pixels. To form an image, a display driver selectively colors the pixels. Because the individual pixels are so small, the display appears to a human viewer to be a continuous rendering of an image. This illusion is particularly effective for complex images of continuous tones such as photographs.

For simple geometric shapes, however, the pixelated nature of the display can become apparent to the human viewer. For example, if the display driver is instructed to draw a straight line, there is no guarantee that the points on that desired line will coincide with the pixels that are available for rendering the line. As a result, the desired line is often rendered by a rasterized line of pixels that are close to but not necessarily coincident with the desired line. This results in rasterized lines that have a jagged or echeloned appearance.

In the course of rendering an image, a large number of straight lines and line segments are often drawn. As a result, given a desired line, the display driver must frequently select those pixels that will minimize the jagged appearance of the resulting rasterized line. A straightforward mathematical approach is to use the equation of the desired line and the coordinates of the available pixels to minimize a least square error across all points on the line. While such an approach has the advantage of globally optimizing the selection of pixels on the rasterized line, the large number of floating point operations required causes this approach to be prohibitively time-consuming.

To meet constraints on speed, display drivers typically implement rasterization methods that avoid time-consuming floating point operations. Among the methods that meet the foregoing constraints is that taught in Bresenham, J. E., "Algorithm for Computer Control of a Digital Plotter," IBM System Journal, Vol. 4, pp.25–30, 1965, the contents of which are herein incorporated by reference. Using only integer operations, the Bresenham algorithm reduces the choice of what pixel to select to an examination of the sign of a discriminant.

Even faster rasterization methods exist that select multiple points on the rasterized line based on the outcome of a single decision. There also exist a variety of rasterization methods aimed at rendering conic sections and quadric sections on a pixelated display.

However, the foregoing rasterization methods all rely on the assumption that the array of pixels is arranged in a uniform rectangular grid that can readily be modeled by a Cartesian coordinate system. This is a reasonable assumption given the prevalence of two-dimensional displays such as computer monitors and printers at the time these algorithms were developed.

Since then, however, volumetric, or three-dimensional displays have been developed. Such displays permit the generation, absorption, or scattering of visible radiation from a set of localized and specified regions within a volume. Examples of such systems are taught in Hirsch U.S. Pat. No. 2,967,905, Ketchpel U.S. Pat. No. 3,140,415, Tsao U.S. Pat. No. 5,754,147 and on pages 66–67 of *Aviation Week*, Oct. 31, 1960.

In a typical volumetric display 1, shown in FIG. 1, a motor 2 spins an imaging plate 3 rapidly about an axis 4. A light source 5 under the control of a display driver 6 illuminates selected spots 7 on the imaging plate 3 at successive instants. If the imaging plate 3 spins rapidly enough, and if the successive instants are separated by short enough time intervals, a continuous curve will appear to hang in mid-air.

FIG. 2 illustrates an example in which the display driver 6 renders a line 8 in a plane perpendicular to the axis 4. In FIG. 2, the imaging plate 3 is shown in six successive instants as it rotates around the axis 4, now perpendicular to the page. At each of the six instants, the light source 5, under the control of the display driver 6, illuminates a spot 7 on the imaging plate 3. As shown in FIG. 2, by aiming the light source 5 at the correct spot and firing the light source 5 at the right time, it is possible to trace out the line 8. It is the function of the display driver 6 to correctly aim and fire the light source 5 so as to trace out the line 8.

To aim the light source 5, the display driver 6 needs a way to identify points in space. In other words, the display driver 6 needs a coordinate system. One possible coordinate system is a Cartesian coordinate system.

Using a Cartesian coordinate system, the display driver 6 would draw the line 8 in FIG. 2 by specifying, for example, that at time $t_1$ the light-source 5 should aim 30 units north, at time $t_2$, the light-source 5 should aim 29 units north and 1 unit east, at time $t_3$, the light-source 5 should aim 28 units north and 2 units east, and so on. To ensure that the imaging plate 3 is at the appropriate location, the display driver 6 also has to specify the values of the times $t_1$, $t_2$ and $t_3$ based on how fast the imaging plate 3 is spinning. Although the spinning of the imaging plate 3 can be resolved into a north-south component and an east-west component, this is a computationally taxing exercise that can easily be avoided by using a polar coordinate system.

As an alternative, the display driver 6 could draw the line in FIG. 2 in polar coordinates by specifying, for example, that at time $t_1$, the light source 5 should aim 30 units away from the axis 4 at a 90 degree angle, at time $t_2$, the light source 5 should aim 29.02 units from the axis 4 at an angle of 88.03 degrees, and at time $t_3$, the light source 5 should aim at 28.07 units from the axis 4 at an angle of 85.91 degrees. This would, of course, draw the same line that was drawn using Cartesian coordinates. The advantage of using polar coordinates becomes apparent when it comes time to specify when to fire the light source 5. Because the imaging plate 3 is spinning, it is far more natural to represent its motion in terms of degrees per second than it is to resolve its motion into a north-south component and an east-west component. For this reason, calculations involving motion of the imaging plate 3 in a volumetric display are best performed in terms of a polar coordinate system, or in a three-dimensional case, a cylindrical coordinate system.

The process of rendering a line in a polar coordinate system is fundamentally different from that of rendering a line in a Cartesian coordinate system. In a Cartesian coordinate system, a line has a constant slope. A unit change in the horizontal direction always results in the same change in the vertical direction, regardless of where that change occurs. This is not the case in a polar coordinate system.

In a polar coordinate system, the slope of a line can vary dramatically with position along the line. In contrast to a Cartesian coordinate system in which the slope of a line is constant at all points on the line, the slope of a line in a polar coordinate system can vary all the way from minus infinity to positive infinity, passing through zero in the process. For those portions of the line that are closest to the origin of the polar coordinate system, the change in distance of the line from the origin changes very slowly with angle. In these portions, the slope of the line is close to zero. For those portions of the line that are far from the origin of the polar coordinate system, even a small change in angle results in a huge change in radial distance from the origin. For these portions of the line, the slope approaches infinity.

SUMMARY

The present invention provides an efficient method of determining what pixels on a polar grid of pixels best approximate a straight line in polar coordinates. The method provides for rendering a first pixel on a rasterized line approximating the desired line and determining the local slope of the desired line in the neighborhood of that first pixel. A discriminant is then evaluated in the neighborhood of the first pixel, and at or near the midpoint between two candidate pixels. The sign of the discriminant, together with the local slope of the desired line, enable the selection of a direction from the first pixel to a subsequent pixel on the rasterized line.

The desired line is partitioned into a plurality of segments, each of which is associated with a range of local slope of the desired line. Useful ranges include those ranges in which the local slope of the line is less than −1 and greater than +1 and those ranges in which the local slope of the desired line is between −1 and 0 and between 0 and +1. These ranges enable the software instructions for implementing the method to be optimized to exploit properties of the desired line in those ranges.

The method also includes updating the discriminant once the subsequent pixel on the rasterized line has been selected. Because the discriminant is linear in the radial direction, a displacement in only the radial direction permits the discriminant to be updated by incrementing by a selected amount. If the subsequent pixel is shifted in the angular direction relative to the first pixel, the discriminant is updated by incorporating information indicative of the angular coordinate of the subsequent pixel. This is achieved by using a look-up table to obtain information corresponding to the angular coordinate of the subsequent pixel.

BRIEF DESCRIPTION OF THE FIGURES

FIG. 7 shows a section of code illustrating one implementation of the initialization step shown in FIG. 6;

FIG. 8 shows a section of code illustrating another implementation of the initialization step shown in FIG. 6;

FIG. 9 shows a section of code illustrating one implementation of the rasterization method applied to a portion of the line of FIG. 3 in which the slope is less than or equal to −1;

FIG. 10 shows a section of code illustrating one implementation of the rasterization method applied to a portion of the line of FIG. 3 in which the slope is greater than −1 but less than or equal to 0;

FIG. 11 shows a section of code illustrating one implementation of the rasterization method applied to a portion of the line of FIG. 3 in which the slope is greater than 0 but less than or equal to 1;

FIG. 12 shows a section of code illustrating one implementation of the rasterization method applied to a portion of the line of FIG. 3 in which the slope is greater than 1;

DETAILED DESCRIPTION

The equation of a line in polar coordinates is given by $$A \cdot r\cos(\theta) + B \cdot r\sin(\theta) + C = 0$$

This is derived by substituting $$x = r\cos(\theta) \text{ and } y = r\sin(\theta)$$

in the Cartesian form for the equation for a line, which is $$A \cdot x + B \cdot y + C = 0$$

Through algebraic and trigonometric manipulation, the equation for a line in polar coordinates can be rewritten as:

$$r = R \cdot \sec(\theta - \alpha)$$

Figure 1:
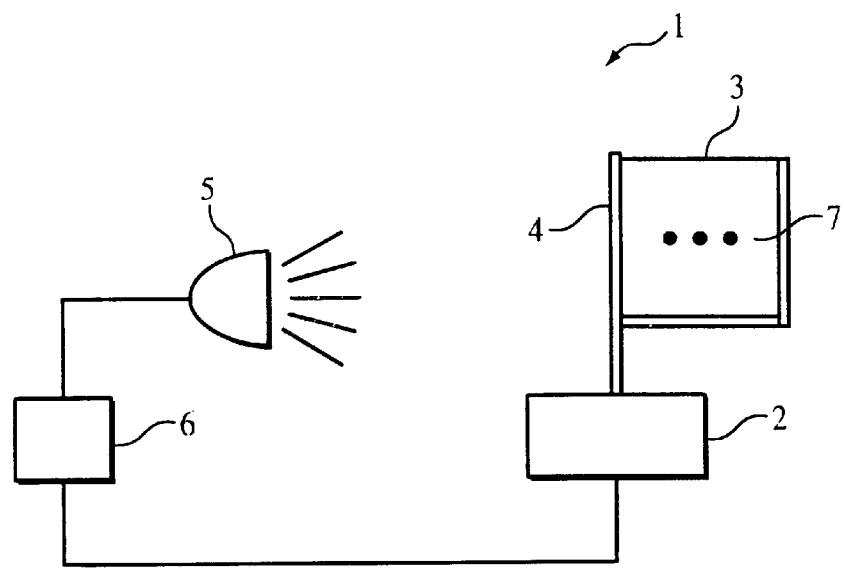
FIG. 1 shows a volumetric display for practice of the invention.
Figure 2:
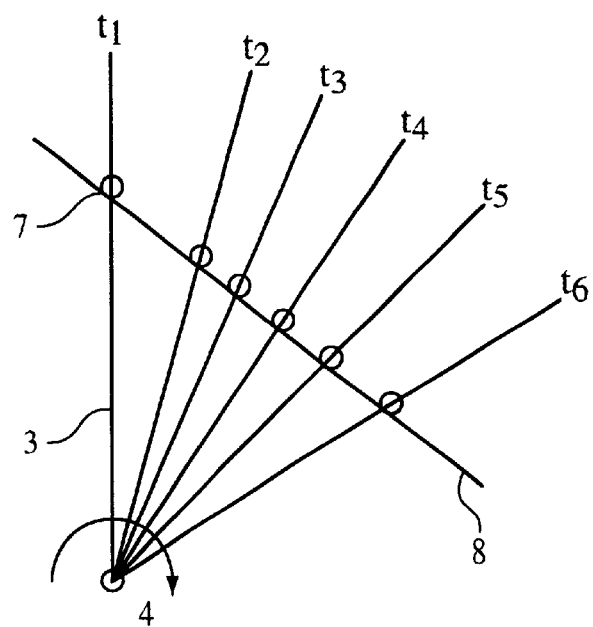
FIG. 2 is a top view of the volumetric display of FIG. 1 showing the rendering of a line.
Figure 3:
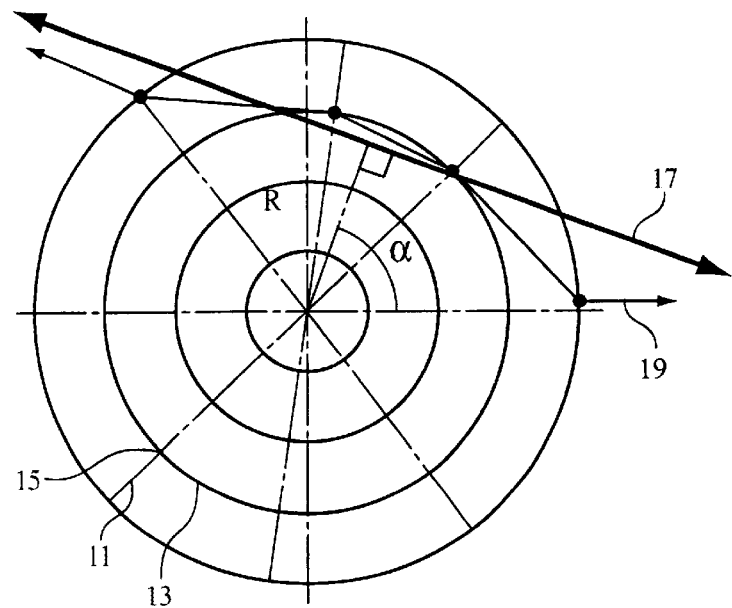
FIG. 3 shows a line in a polar coordinate system.

As shown in FIG. 3, R is the shortest distance from the polar origin to the line. The constant α is the polar angle of the point on the line that is closest to the polar origin. The slope of the line is the rate of change of the radial coordinate r with respect to the angular coordinate θ.

Figure 5:
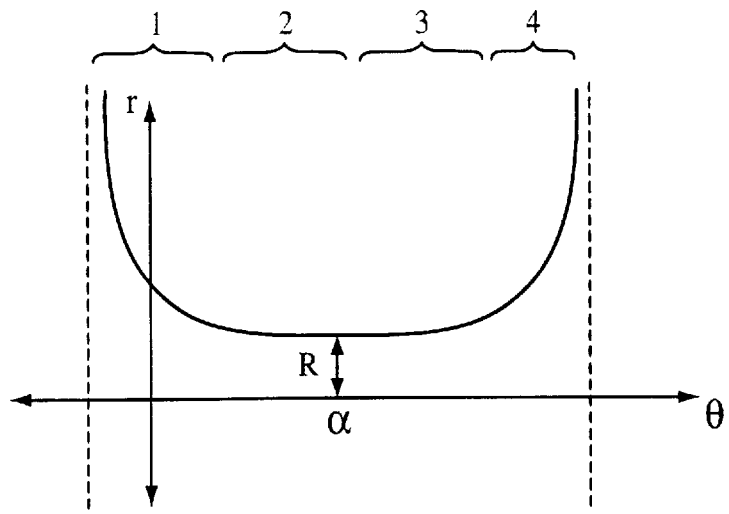
FIG. 5 shows the line of FIG. 3 when the polar grid is distorted into a rectangular grid.

To more easily see the variation in slope along the line, it is useful to view the line drawn in FIG. 3 on a coordinate grid in which the grid lines are perpendicular, as shown in FIG. 5. In the coordinate grid of FIG. 5, the polar grid of FIG. 3 has been distorted into a rectilinear grid. In the process, the straight line in FIG. 3 has also been distorted into a curve. The distortion applied to the polar grid to form the rectilinear grid is such that the local slope of the line remains unchanged.

As shown in FIG. 5, the slope of the line approaches ±∞ when the angular coordinate approaches these extremes, α±π/2 respectively. The slope of the line is zero when the angular coordinate equals α. In between these extremes, the slope is proportional to the secant of the difference between the angular coordinates θ and α.

At the outset, it is useful to draw a distinction between a "desired line" and a "rasterized line" that approximates the desired line. A desired line, as the name implies, is the line that would be drawn by a display having infinite resolution. A rasterized line is the set of pixels that best approximates the desired line. "Rasterization" is the process of selecting, from all the pixels available on the display, those pixels that best approximate the desired line.

The intersection of a radial grid-line 11 and a concentric circle 13 in FIG. 3 defines a pixel that is available for representing part of a desired line 17. It is only in the rarest cases that a desired line passes through nothing but available pixels. Hence, in virtually all cases, it is necessary to construct a rasterized line 19 by selecting those pixels, or intersections, that best approximate the desired line 17. These pixels must be quickly selected, before a user notices a significant delay.

Figure 4:
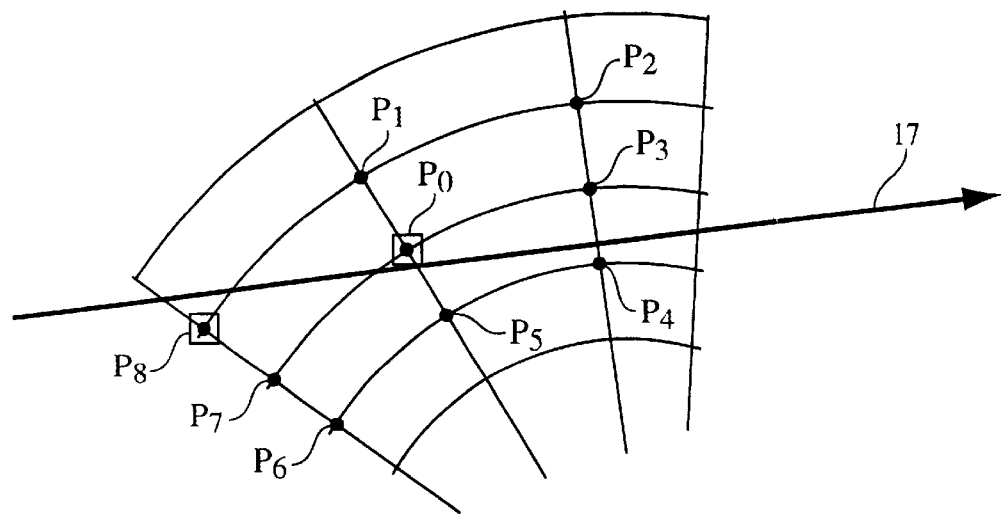
FIG. 4 shows a close-up of the polar grid in FIG. 3.

To achieve the required performance, the method of the invention selects the next pixel on a rasterized line using only the preceding pixel and the sign of a discriminant function evaluated at the midpoint between two candidate pixels. The question then becomes: how does one select two candidate pixels from the multiplicity of available pixels. FIG. 4, which shows a close-up of the grid in FIG. 3, illustrates this process.

In FIG. 4, the rasterized line is drawn in the direction indicated by the arrow on the desired line 17. The pixels labeled "P8" and "P0" are part of the rasterized line that approximates the desired line 17. The pixel that has most recently been selected to be a part of the rasterized line is the pixel labeled "P0." Having selected P0, the display driver must now select the next pixel on the line.

Inspection of FIG. 4 suggests that it would be incorrect to select a pixel on the radial line containing P8, P7, and P6. Selection of any pixel on this radial line would cause the rasterized line to double back on itself. Pixels on the radial line containing P0, for example P1 and P5, might be appropriate were the desired line to have a slope that carried it in a more radial direction. However, in this case, the slope of the desired line is such that it is almost perpendicular to the radial lines.

It is apparent from FIG. 4 that the line travels in a predominantly angular direction rather than in a predominantly radial direction. As a result, the most likely candidate pixels for the next pixel on the rasterized line are those on the next radial line. These include pixels labeled P2, P3, P4, and all other pixels on that radial line. Of all these pixels, there are only two that have the property that the line passes between them with no other intervening pixels. It is one of these two pixels, in this case P3 and P4, that the display driver will select to become the next pixel on the rasterized line.

To select which of the two pixels, P3 or P4, will join pixels P0 and P8 as members of the rasterized line, the display driver determines the midpoint between the two pixels. If the desired line passes between this midpoint and P4, then P4 will become the next pixel on the rasterized line. Otherwise, the next pixel will be P3. This method of selecting the next pixel from two candidate pixels is referred to as the "midpoint method."

In a polar coordinate system, the choice of the candidate pixels depends on the local slope of the desired line. In addition, the evaluation of the discriminant can be optimized in different ways depending on the local slope of the desired line. Since, in a polar coordinate system, the local slope need not be constant along a line, it is useful to divide the desired line into four regions depending on its local slope. Referring again to FIG. 5, with the slope m being defined as $dr/d\theta$, region 1 corresponds to those portions of the desired line having a slope $m \leq -1$, region 2 corresponds to those portions of the desired line having a slope m satisfying $-1 < m \leq 0$, region 3 corresponds to those portions of the desired line having a slope m satisfying $0 < m \leq 1$, and region 4 corresponds to those portions of the desired line having a slope $m > 1$.

Figure 6:
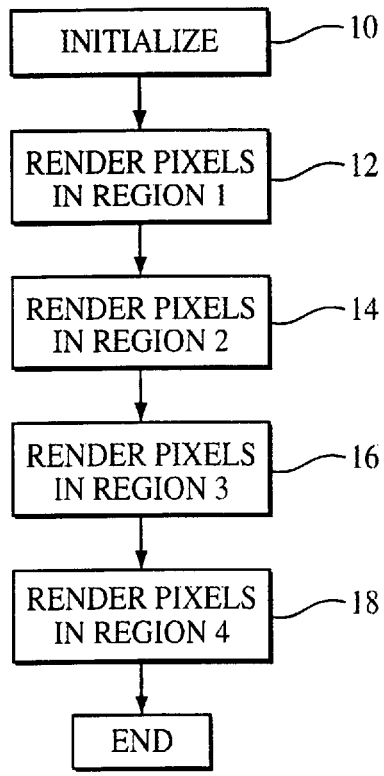
FIG. 6 is a flowchart of one embodiment of a rasterization method incorporating the principles of the invention.

FIG. 6 shows a high-level flowchart for implementing the rasterization method of the invention. The method begins with an initialization step in which the inputs are the endpoints of the desired line (step 10).

Once the initialization process is complete, the display driver renders the rasterized line beginning with those portions having slopes that are in the interval specified in region 1 (step 12) and proceeding sequentially through those portions of the line having slopes within the intervals specified in regions 2, 3 and 4 (step 14, 16, 18).

FIG. 7 shows a Cartesian initialization routine 20 for carrying out the initialization step 10 when the endpoints of the desired line are specified in Cartesian coordinates. To simplify subsequent processing steps, the initialization routine 20 orients the endpoints in a particular order and ensures that the angular coordinates of the points on the line extending between the two endpoints are always increasing.

In the illustrated embodiment, the endpoints are expected to be oriented counter-clockwise around the origin. The instructions therefore include a call to a SWAP function 22 that interchanges the values of its parameters when the endpoints are found to be oriented clockwise. This reorients the endpoints in the counter-clockwise direction when necessary.

Since the endpoints are given in Cartesian coordinates, the Cartesian initialization routine 20 also includes instructions 24 for transforming them into polar coordinates. These instructions are computationally expensive because of their reliance on the sqrt (square root) and atan 2 (arctangent) functions, both of which require numerous floating point operations. However, these computations need only be performed once in the process of rendering the desired line. In addition, when representing the line in polar coordinates, it is convenient for the angular coordinate to be represented in terms of the smallest resolution in the angular direction. This is achieved by using the conversion factor stepsPerRad to convert the result of the arctangent function, which is in radians, into steps around the grid in the angular direction.

In the illustrated embodiment, it is especially convenient for the angular coordinate to always be increasing as one traverses the line. Since the arctangent function returns a value between $-\pi$ and $\pi$, a line in which the angular coordinate passes through $\pi$ can have a discontinuity which causes the angular coordinate to be decreasing even though the endpoints are oriented in the correct direction. To address this problem, the initialization routine 20 includes instructions 26 to add $2\pi$ to the angular coordinate of one endpoint under certain circumstances. Note that $\theta_{numsteps}$ is the number of angular steps in $2\pi$ radians.

Because the individual pixels on the display are addressed as integers, it is convenient to represent the coordinates as integers. For this reason, the initialization routine 20 includes instructions for converting floating point coordinates to integer coordinates using a ROUND function 28 whose output is the nearest integer to its floating point input.

The Cartesian initialization routine 20 also includes instructions for computing quantities that will be repeatedly used in processing steps that follow. These include instructions 30 for calculating the line constants A, B, and C, as specified in the equation $$A \cdot r\cos(\theta) + B \cdot r\sin(\theta) + C = 0$$

and instructions 32 for calculating the minimum distance from the line to the origin.

Finally, the Cartesian initialization routine 20 includes instructions 34 for rendering the first endpoint of the line. This includes a call to a SetPixel function 36 that illuminates a pixel located at r, $\theta$ with a color or intensity specified by its third argument c.

FIG. 8 is a polar initialization routine 46 for the case in which the endpoints of the desired line are specified in polar coordinates. As was the case in connection with the Cartesian initialization routine 20, the polar initialization routine 46 simplifies subsequent processing steps by ensuring that the endpoints are oriented counter-clockwise around the origin and that the angular coordinates of points on the line extending between the endpoints always be increasing. The instructions therefore include a call to a SWAP function 48 that interchanges the values of its parameters when the endpoints are found to be oriented clockwise.

Because it is convenient for the angular coordinates of the points on the line to always be increasing as one traverses the line, the polar initialization routine 46 includes instructions 50 for enforcing this constraint. These instructions 50 provide for incrementing the angular coordinate by $2\pi$ when the difference between the angular coordinates of the endpoints exceeds $0.5\theta_{numsteps}$, numsteps or 180 degrees.

The polar initialization routine 46 also includes instructions for computing quantities that will be repeatedly used in processing steps that follow. These include instructions 52 for calculating the line constants A, B, and C, as specified in the equation $$A \cdot r\cos(\theta) + B \cdot r\sin(\theta) + C = 0$$

and instructions 54 for calculating the minimum distance from the desired line to the origin. Note that the computation of line constants requires transforming the coordinates of the endpoints from polar to rectangular 56. This coordinate transformation uses a look-up table of sines, IntegerSin, and a look-up table of cosines, IntegerCos. Because the discriminant sometimes needs to be evaluated at the midpoint between two pixels, the density of entries in these look-up tables is twice the density of pixels in the angular direction. As a result, the index entries used in the coordinate transformation are $2\theta_1$ and $2\theta_2$ rather than $\theta_1$ and $\theta_2$.

Finally, the polar initialization routine 46 includes instructions 58 for rendering the first endpoint on the display. This includes a call to a SetPixel function 60 that illuminates a pixel located at r, $\theta$ with a color or intensity specified by the third argument C.

The rasterization of the desired line begins in region 1 using the first rasterizing routine 62 shown in FIG. 9. The first rasterization routine 62 includes instructions for initializing 64 the value of the discriminant d. This requires use of the look-up tables IntegerSin and IntegerCos as discussed in connection with FIG. 5.

The first rasterizing routine 62 includes a while loop 66 that terminates when the local slope of the desired line is no longer consistent with being in region 1. Because the endpoints have been oriented in canonical form, it is not necessary to check the absolute value of the slope in the test condition for terminating the while loop 66. Within the while loop 66, there are two choices for the next pixel on the rasterized line. Either the next pixel can be obtained by stepping in both the radial direction and the angular direction, or the next pixel can be obtained by stepping in only the radial direction.

If the discriminant is negative 68, the next pixel is obtained by incrementing the coordinates of the current pixel in both the radial and the angular directions 70. This is followed by a re-evaluation of the discriminant 72 using the essentially the same instructions 64 that were executed at the beginning of the first rasterizing routine 62.

If the discriminant is positive 74, the next pixel is obtained by stepping in only the radial direction 76. This is followed again by a re-evaluation of the discriminant 78. However, in this case, the re-evaluation of the discriminant can be performed by incrementing its current value using previously computed values.

In either case, each iteration of the while loop 66 ends with the rendering of the current pixel on the display using the SetPixel function 80. Following the last iteration of the while loop 66, control is transferred to a second rasterization routine 82 shown in FIG. 10. This second rasterization routine 82 renders those points on the line for which the local slope of the desired line is between −1 and 0.

The second rasterization routine 82 begins with instructions for initializing 84 certain constants that will be used repeatedly within the routine. The rendering of pixels in region 2 is performed by a while loop 86 that terminates when the local slope of the desired line is no longer consistent with being in region 2. Since only the sign of the slope is of interest, and since $d\theta$ is known to be positive, the testing of the local slope in the termination condition for the while loop 86 reduces to a test for the sign of dr. Each iteration of the while loop 86 begins with the updating 87 of the discriminant d. Within the while loop 86, there are two choices for the next pixel on the rasterized line. Either the next pixel can be obtained by stepping in both the radial direction and the angular direction, or the next pixel can be obtained by stepping in only in the angular direction.

If the discriminant is positive 88, the next pixel on the rasterized line is obtained by incrementing the coordinates of the current pixel in both the radial and the angular directions 90. If the discriminant is negative 92, the next pixel is obtained by stepping in only the angular direction 94. Both cases are followed by a re-evaluation of constants that are needed to update the discriminant 96. Because the angular coordinate always changes in region 2, the re-evaluation of these constants requires use of the look-up tables and considerably more processing than was required when only the radial coordinate was incremented, as was the case in region 1.

In either case, each iteration of the while loop 86 ends with the rendering of the current pixel on the display using the SetPixel function 98. Following the last iteration of the while loop 86, control is transferred to a third rasterization routine 100, shown in FIG. 8, those points on the line for which the local slope of the desired line is between 0 and 1.

The third rasterization routine 100 differs from the second 82 primarily in the direction in which r is incremented in evaluating d and dr. The third rasterization routine 100 includes instructions for initializing 102 certain constants that will be used repeatedly within the routine. To save processing time, those constants that already have the correct values as of the end of the second rasterization routine 82 need not be initialized.

The rendering of pixels in region 3 is performed by a while loop 104 that terminates when the local slope of the desired line is no longer consistent with being in region 3. Each iteration of the while loop 104 begins with the updating 106 of the discriminant d. Within the while loop 104, there are two choices for the next pixel on the rasterized line. Either the next pixel can be obtained by stepping in both the radial direction and the angular direction, or the next pixel can be obtained by stepping in only the angular direction.

If the discriminant is non-positive 108, the next pixel is obtained by incrementing the coordinates of the current pixel in both the radial and the angular directions 110. If, instead, the discriminant is positive 112, the next pixel is obtained by stepping in only the angular direction 114. Both cases are followed again by a re-evaluation of constants needed to update the discriminant 116. Because in both cases the angular coordinate changes regardless of the sign of the discriminant, the re-evaluation of these constants requires use of the look-up tables and considerably more processing than was required for updating the discriminant when only the radial coordinate was incremented, as was the case in region 1.

In either case, each iteration of the while loop 104 ends with the rendering of the current pixel on the display using the SetPixel function 118. Following the last iteration of the while loop 104, control is transferred to a fourth, and final rasterization routine 120 shown in FIG. 9.

The fourth rasterization routine 120 includes instructions for initializing 122 the value of the discriminant d. This is essentially the same procedure as was used in the first rasterization routine 62, discussed in connection with FIG. 6. To save processing time, any constants that already had the correct values as of the termination of the third rasterization routine 100 are not re-initialized.

The rendering of pixels in region 4 is performed by a while loop 124 that terminates upon reaching the second endpoint of the desired line. Because this is now the last region to be rendered, it is not necessary to check the local slope of the line. Within the while loop 124, there are two choices for the next pixel on the rasterized line. Either the next pixel can be obtained by stepping in both the radial direction and the angular direction, or the next pixel can be obtained by stepping in only the radial direction.

If the discriminant is positive 126, the next pixel on the rasterized line is obtained by incrementing the coordinates of the current pixel in both the radial and the angular directions 128. This is followed by a re-evaluation of the discriminant 130 using essentially the same instructions 122 that were executed at the beginning of the fourth rasterizing routine 120.

If the discriminant is not positive 132, the next pixel is obtained by stepping in only the radial direction 134. This is followed again by a re-evaluation of the discriminant 136. However, in this case, the re-evaluation of the discriminant can be performed by incrementing its value using only integer arithmetic.

In either case, each iteration of the while loop 124 ends with the rendering of the current pixel on the display using the SetPixel function 138. Following the last iteration of the while loop 124, the rasterization method terminates and the viewer sees a display similar to that in FIG. 10.

It is apparent from the foregoing discussion of the detailed steps of rasterization that the software instructions can be optimized for each of the four regions, thereby increasing the speed at which a line can be drawn on the display. For example, in regions 1 and 4, certain iterations of the while loops require incrementing in only the radial direction and not the angular direction. Because the discriminant is linear in the radial direction, it can be updated using only a single addition operation. Another example is the manner in which the termination conditions in each while loop become progressively simpler, until in region 4, the termination condition for the while loop does not need to test the slope of the desired line at all. Yet another example is the manner in which most constants need not be initialized at the beginning of the third rasterization routine because those constants have been left with the proper values upon termination of the second rasterization routine.

Figure 13:
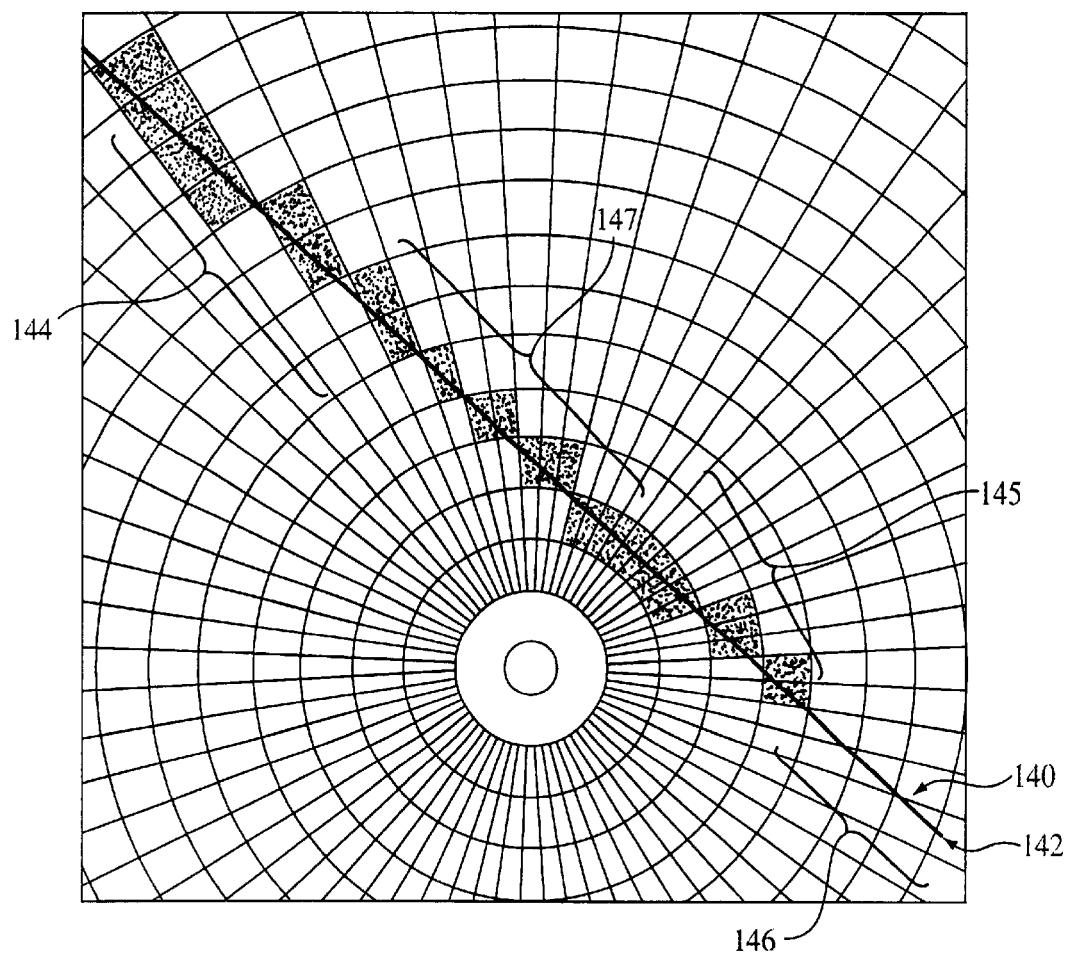
FIG. 13 shows the result of rasterizing a line in polar coordinates.

FIG. 13 shows a desired line 140 together with a rasterized line 142 corresponding to the desired line 140. Far from the polar origin, the rasterized line 142 includes a segment 144 corresponding to region 4. This segment 144 includes long stretches in which the pixels are incremented only in the radial direction, and several discontinuities in which the pixels are incremented in both the radial and angular directions. For the illustrated line 142, this segment 144 can be drawn quickly because the discriminant can be quickly updated.

The rasterized line also includes second and third segments 145, 147 that correspond to regions 2 and 3. In these segments, the rasterized line consists of pixels that are always incremented in the angular direction and occasionally incremented in both the angular direction and the radial direction. The second and third segments 145, 147 are drawn more slowly because the processing steps associated with incrementing in the angular direction are more complex than those associated with incrementing in the radial direction.

Finally, the rasterized line also includes a fourth segment 146 that corresponds to region 1. This fourth segment, only a portion of which is shown, also includes long stretches in which the pixels are incremented only in the radial direction. These long stretches lie outside the boundaries of FIG. 13. Like the first segment 144, the fourth segment 146 can be drawn quickly at portions in which pixels are incremented in the radial direction. For those portions shown in FIG. 13 however, the pixels are incremented in both the radial and angular direction. Hence those portions are drawn more slowly.

Figure 14:
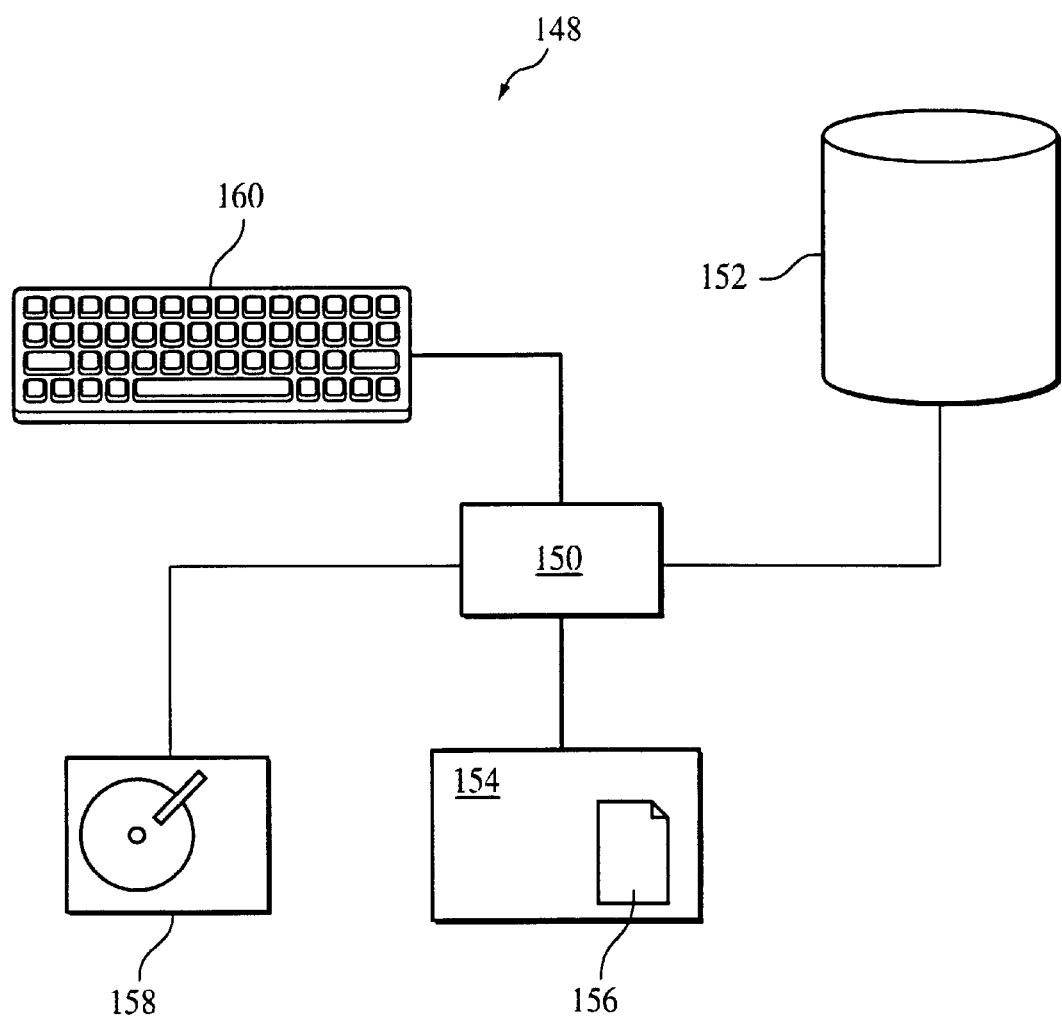
FIG. 14 is a system for implementing the rasterization method illustrated in FIG. 6.

FIG. 14 shows a system 148 for implementing the foregoing method. The system includes a processor 150 in communication with a volumetric display 152 having a cylindrical coordinate grid of voxels and memory 154 for storage of software 156 for implementing the foregoing method. The memory 154, which is in communication with the processor 150, can be volatile memory, such as RAM, or non-volatile memory, such as ROM or one of its variants. When the memory is RAM, the system 148 also includes a non-volatile storage device 158 for storing the software 156. The storage device 158 is in communication with the processor 150 to permit loading of the software 156 into memory 154. The system 148 also includes an input device 160 in communication with the processor 150 to permit a user to control the operation of the display 152.

Although FIGS. 7–12 show software instructions written in a C like language, it is understood that the subject matter of the invention is not limited by the such details as the choice of programming language or the specific names given to variables and arrays within the software instructions. Other programming languages are suitable for implementing the rasterization method of the invention.

In addition, although the implementation set forth above contains many specific details, these are not to be construed as limiting the scope of the appended claims. For example, the foregoing instructions can be modified to use fixed point rather than floating point arithmetic where appropriate. In addition, the order in which the regions are traversed is not important. Although the illustrated implementation requires that the line be drawn in a counter-clockwise direction, one can also draw the line in the opposite direction or split the line into multiple segments with each segment being independently drawable in either the clockwise or counter-clockwise direction.

The coordinate transformation between polar coordinates and Cartesian coordinates is also not limited to that used in the illustrated embodiment. For example, although the illustrated embodiment uses a mapping in which the origin of the Cartesian coordinate system and the polar origin coincide and the polar ray for θ=0 maps to the positive x-axis, any linear transformation can be used by simply multiplying the coordinates of the endpoints by an appropriate 3×3 homogeneous matrix. In addition, although the coordinate mapping of the illustrated embodiment assumes a pixel coincident with the origins of both the polar coordinate system and the Cartesian coordinate system, this need not be the case. A coordinate system in which the origin falls between pixels can be accommodated by simple modification to the code.

It is also possible to implement the rasterization method using the alternate representation of the discriminant, namely $r\cos(\theta-\alpha)-R=0$ However, a disadvantage of this approach is that alpha can be any floating point number. As a result, there is no guarantee that the look-up table for the cosine function will have an entry corresponding to $\theta-\alpha$.

Having described the invention, and a preferred embodiment thereof, what we claim as new and secured by Letters Patent is:

1. A method of rendering, on a display, a rasterized line that approximates a desired line, said display having a plurality of pixels each defined by a radial coordinate and an angular coordinate, said method comprising:

rendering, on said display, a first pixel on said rasterized line, said first pixel being selected from said plurality of pixels and having a first radial coordinate and a first angular coordinate;

determining a sign of a discriminant value of said desired line in a neighborhood of said first pixel;

on the basis of said sign of said discriminant value, said first radial coordinate and said first angular coordinate, determining
  a second radial coordinate by incrementing said first radial coordinate by a selected radial displacement, and
  a second angular coordinate by incrementing said first angular coordinate by a selected angular displacement; and rendering a second pixel on said rasterized line at a location specified by said second radial coordinate and said second angular coordinate.

2. The method of claim 1 further comprising determining that said desired line is directed in a predominantly angular direction and setting said selected radial displacement to be zero.

3. The method of claim 1 further comprising determining that said desired line is directed in a predominantly radial direction and setting said selected angular displacement to be zero.

4. The method of claim 1 wherein approximating said discriminant value comprises determining said local slope of said desired line in a neighborhood of said first pixel.

5. The method of claim 1 further comprising updating said discriminant in preparation for rendering a subsequent point on said rasterized line.

6. The method of claim 5 wherein updating said discriminant comprises:

determining that said first and second angular coordinates are essentially equal;

retrieving an already computed angle-dependent constant; and incrementing said discriminant by said already computed angle dependent constant.

7. The method of claim 5 wherein updating said discriminant comprises:

determining that said first and second angular coordinates are not equal;

obtaining a value dependent on said second angular coordinate; and incorporating said value in said discriminant.

8. The method of claim 7 wherein obtaining said value dependent on said second angular coordinate comprises retrieving said value from a look-up table.

9. A method of rendering, on a display having a plurality of pixels defined by a polar coordinate system, a rasterized line that approximates a desired line, the method comprising:

rendering a first pixel on said rasterized line;

determining, on the basis of a local slope of said desired line and a sign of a discriminant of said desired line in a neighborhood of said first pixel, a direction of a subsequent pixel on said rasterized line relative to said first pixel;

rendering a second pixel on said rasterized line, said second pixel being displaced from said first pixel in said direction.

10. The method of claim 9 further comprising evaluating said discriminant at a midpoint between two candidate pixels from which said subsequent pixel is to be selected.

11. The method of claim 9 wherein determining a direction comprises partitioning said desired line into a plurality of segments, each segment being associated with a range of local slopes of said desired line.

12. The method of claim 9 further comprising updating said discriminant.

13. The method of claim 12 wherein updating said discriminant comprises:

incrementing said discriminant by a selected amount when said subsequent pixel is displaced from said first pixel in a radial direction; and incorporating information indicative of an angular coordinate of said subsequent pixel when said subsequent pixel is displaced from said second pixel in an angular direction.

14. The method of claim 13 wherein incorporating information indicative of an angular coordinate of said subsequent pixel comprises obtaining information from a look-up table corresponding to said angular coordinate of said subsequent pixel.

15. A computer-readable medium having encoded thereon software for rendering, on a display, a rasterized line that approximates a desired line, said display having a plurality of pixels each defined by a radial coordinate and an angular coordinate, said software comprising instructions for:

rendering, on said display, a first pixel on said rasterized line, said first pixel being selected from said plurality of pixels and having a first radial coordinate and a first angular coordinate;

determining a sign of a discriminant value of said desired line in a neighborhood of said first pixel;

on the basis of said sign of said discriminant value, said first radial coordinate and said first angular coordinate, determining
  a second radial coordinate by incrementing said first radial coordinate by a selected radial displacement, and
  a second angular coordinate by incrementing said first angular coordinate by a selected angular displacement; and rendering a second pixel on said rasterized line at a location specified by said second radial coordinate and said second angular coordinate.

16. The computer-readable medium of claim 15 wherein said software further comprises instructions for determining that said desired line is directed in a predominantly angular direction and setting said selected radial displacement to be zero.

17. The computer-readable medium of claim 15 wherein said software further comprises instructions for determining that said desired line is directed in a predominantly radial direction and setting said selected angular displacement to be zero.

18. The computer-readable medium of claim 15 wherein said instructions for approximating said discriminant value comprise instructions for determining said local slope of said desired line in a neighborhood of said first pixel.

19. The computer-readable medium of claim 15 wherein said software further comprises instructions for updating said discriminant in preparation for rendering a subsequent point on said rasterized line.

20. The computer-readable medium of claim 19 wherein said instructions for updating said discriminant comprise instructions for:

determining that said first and second angular coordinates are essentially equal;

retrieving an already computed angle-dependent constant; and incrementing said discriminant by said already computed angle dependent constant.

21. The computer-readable medium of claim 19 wherein said instructions for updating said discriminant comprise instructions for:

determining that said first and second angular coordinates are not equal;

obtaining a value dependent on said second angular coordinate; and incorporating said value in said discriminant.

22. The computer-readable medium of claim 21 wherein said instructions for obtaining said value dependent on said second angular coordinate comprises retrieving said value from a look-up table.

23. A computer-readable medium having encoded thereon software for rendering, on a display having a plurality of pixels defined by a polar coordinate system, a rasterized line that approximates a desired line, the computer-readable medium comprising instructions for:

rendering a first pixel on said rasterized line;

determining, on the basis of a local slope of said desired line and a sign of a discriminant of said desired line in a neighborhood of said first pixel, a direction of a subsequent pixel on said rasterized line relative to said first pixel;

rendering a second pixel on said rasterized line, said second pixel being displaced from said first pixel in said direction.

24. The computer-readable medium of claim 23 wherein said software further comprises instructions for evaluating said discriminant at a midpoint between two candidate pixels from which said subsequent pixel is to be selected.

25. The computer-readable medium of claim 23 wherein said instructions for determining a direction comprise instructions for partitioning said desired line into a plurality of segments, each segment being associated with a range of local slopes of said desired line.

26. The computer-readable medium of claim 23 wherein said software further comprises instructions for updating said discriminant.

27. The computer-readable medium of claim 26 wherein said instructions for updating said discriminant comprise instructions for:

incrementing said discriminant by a selected amount when said subsequent pixel is displaced from said first pixel in a radial direction; and incorporating information indicative of an angular coordinate of said subsequent pixel when said subsequent pixel is displaced from said second pixel in an angular direction.

28. The computer-readable medium of claim 27 wherein said instructions for incorporating information indicative of an angular coordinate of said subsequent pixel comprise instructions for obtaining information from a look-up table corresponding to said angular coordinate of said subsequent pixel.

* * * * *